(12) United States Patent
Huang et al.

(10) Patent No.: US 10,252,149 B2
(45) Date of Patent: Apr. 9, 2019

(54) INTERACTIVE VENDING SYSTEM AND METHOD

(71) Applicant: Ming-Jian Huang, Taichung (TW)

(72) Inventors: Ming-Jian Huang, Taichung (TW); En-Hsin Chu, Taichung (TW); Yu-Tsen Huang, Taichung (TW); Kuan-Wei Huang, Taichung (TW)

(73) Assignee: Ming-Jian Huang, Taichung (TW)

( * ) Notice: Subject to any disclaimer, the term of this patent is extended or adjusted under 35 U.S.C. 154(b) by 0 days.

(21) Appl. No.: 15/457,894

(22) Filed: Mar. 13, 2017

(65) Prior Publication Data

US 2017/0266544 A1 Sep. 21, 2017

(30) Foreign Application Priority Data

Mar. 18, 2016 (TW) .............................. 105203716 U

(51) Int. Cl.
| | | |
|---|---|---|
| *A63F 9/24* | (2006.01) | |
| *A63F 9/30* | (2006.01) | |
| *G06K 7/10* | (2006.01) | |
| *G06K 19/06* | (2006.01) | |
| *G07F 11/46* | (2006.01) | |
| *G07F 17/32* | (2006.01) | |
| *G07F 9/02* | (2006.01) | |
| *G07F 11/16* | (2006.01) | |
| *G07F 11/44* | (2006.01) | |

(52) U.S. Cl.
CPC .................. *A63F 9/30* (2013.01); *A63F 9/24* (2013.01); *G06K 7/10366* (2013.01); *G06K 19/06037* (2013.01); *G07F 9/026* (2013.01); *G07F 11/165* (2013.01); *G07F 11/44* (2013.01); *G07F 11/46* (2013.01); *G07F 17/3234* (2013.01); *G07F 17/3297* (2013.01); *A63F 2009/2442* (2013.01); *A63F 2009/2489* (2013.01)

(58) Field of Classification Search
CPC ...... A63F 9/30; A63F 9/24; A63F 2009/2442; A63F 2009/2489; G06K 7/10366; G06K 19/06037; G07F 9/026; G07F 11/165; G07F 11/44; G07F 11/46; G07F 17/3234; G07F 17/3297
See application file for complete search history.

(56) References Cited

U.S. PATENT DOCUMENTS

| | | | | |
|---|---|---|---|---|
| 9,524,368 | B2 * | 12/2016 | Kuehnrich | ............ G06F 17/602 |
| 9,959,530 | B2 * | 5/2018 | Geigel | .................... G07F 9/026 |
| 2002/0010857 | A1 * | 1/2002 | Karthik | ................... G06F 21/32 |
| | | | | 713/168 |
| 2002/0026366 | A1 * | 2/2002 | Ohtsuki | ............ G05B 19/0421 |
| | | | | 705/16 |
| 2010/0090408 | A1 * | 4/2010 | Fukazawa | ................. A63F 9/30 |
| | | | | 273/447 |
| 2014/0142748 | A1 * | 5/2014 | Geigel | .................... G07F 9/026 |
| | | | | 700/237 |

(Continued)

*Primary Examiner* — Corbett B Coburn
(74) *Attorney, Agent, or Firm* — Bruce Stone LLP; Joseph Bruce

(57) ABSTRACT

An interactive vending system includes at least one vending machine, at least one portable device, a management server and two routers. The first router is connected to the vending machine, thereby connecting the vending machine to the internet. The portable device is connected to the internet. The second router is connected to the management server, thereby connecting the management server to the internet.

10 Claims, 3 Drawing Sheets

(56) References Cited

U.S. PATENT DOCUMENTS

| | | | |
|---|---|---|---|
| 2016/0023097 A1* | 1/2016 | Balaban | G07F 17/3202 |
| | | | 273/447 |
| 2016/0078716 A1* | 3/2016 | Goldman | G07F 17/3223 |
| | | | 463/5 |
| 2016/0379450 A1* | 12/2016 | Shoemaker, Jr. | G07F 17/3297 |
| | | | 273/447 |
| 2017/0295506 A1* | 10/2017 | Rucker | H04L 45/306 |
| 2017/0316645 A1* | 11/2017 | Wei | A63F 9/305 |

* cited by examiner

INTERACTIVE VENDING SYSTEM AND METHOD

BACKGROUND OF INVENTION

1. Field of Invention

The present invention relates to interactive entertainment and, more particularly, to an interactive vending system and system.

2. Related Prior Art

A typical doll-clipping machine is a coin-operated machine that requires a person to insert at least one coin therein to start a round of game. It is troublesome for a person to get a coin to start a round of game when the person happens to see a doll-clipping machine and feels like using it. It is more troublesome to get a coin to start a round of game when the person runs out of coin in a previous round of game. Moreover, scores cannot be recorded for statistics. Hence, the doll-clipping machine fails to propel a person to play once and again, trying to break an outstanding record or accumulate enough points for rewards. In addition, it is difficult for a store to manage the inventory of dolls in the doll-clipping machine. Furthermore, it difficult for the store to allure a person by letting the person to play a round of game free of charge unless the store gives away a coin and risks losing the coin.

The present invention is therefore intended to obviate or at least alleviate the problems encountered in prior art.

SUMMARY OF INVENTION

It is an objective of the present invention to provide an interactive vending system that allows communication of transaction data and verification data via the internet for remote management.

It is another objective of the present invention to provide an interactive vending system that accumulates and records transaction data of a player for rewarding and alluring the player to continue to play.

To achieve the foregoing objectives, the interactive vending system includes at least one vending machine, at least one portable device, a management server and two routers. The vending machine includes a processing unit, a charging unit, a product-capturing unit, a control unit, a sensor, and a web-connecting unit. The charging unit is electrically connected to the processing unit. The product-capturing unit is electrically connected to the processing unit. The control unit is electrically connected to the processing unit and operable for controlling the product-capturing unit. The sensor is electrically connected to the processing unit and adapted for detecting a product captured and dropped onto a chute of the vending machine. The web-connecting unit is electrically connected to the processing unit and made with a port. The first router is connected to the port, thereby connecting the vending machine to the internet. The portable device includes an initiating unit and a wireless communication unit electrically connected to the initiating unit and adapted for communicating data with the web-connecting unit via the internet. The management server includes a control unit, a recording unit and a communication unit. The control unit and the recording unit are used to manage data of transactions. The communication unit is electrically connected to the control unit and made with a port. The second router is connected to the port of the management server, thereby connecting the management server to the internet.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Figure 1:
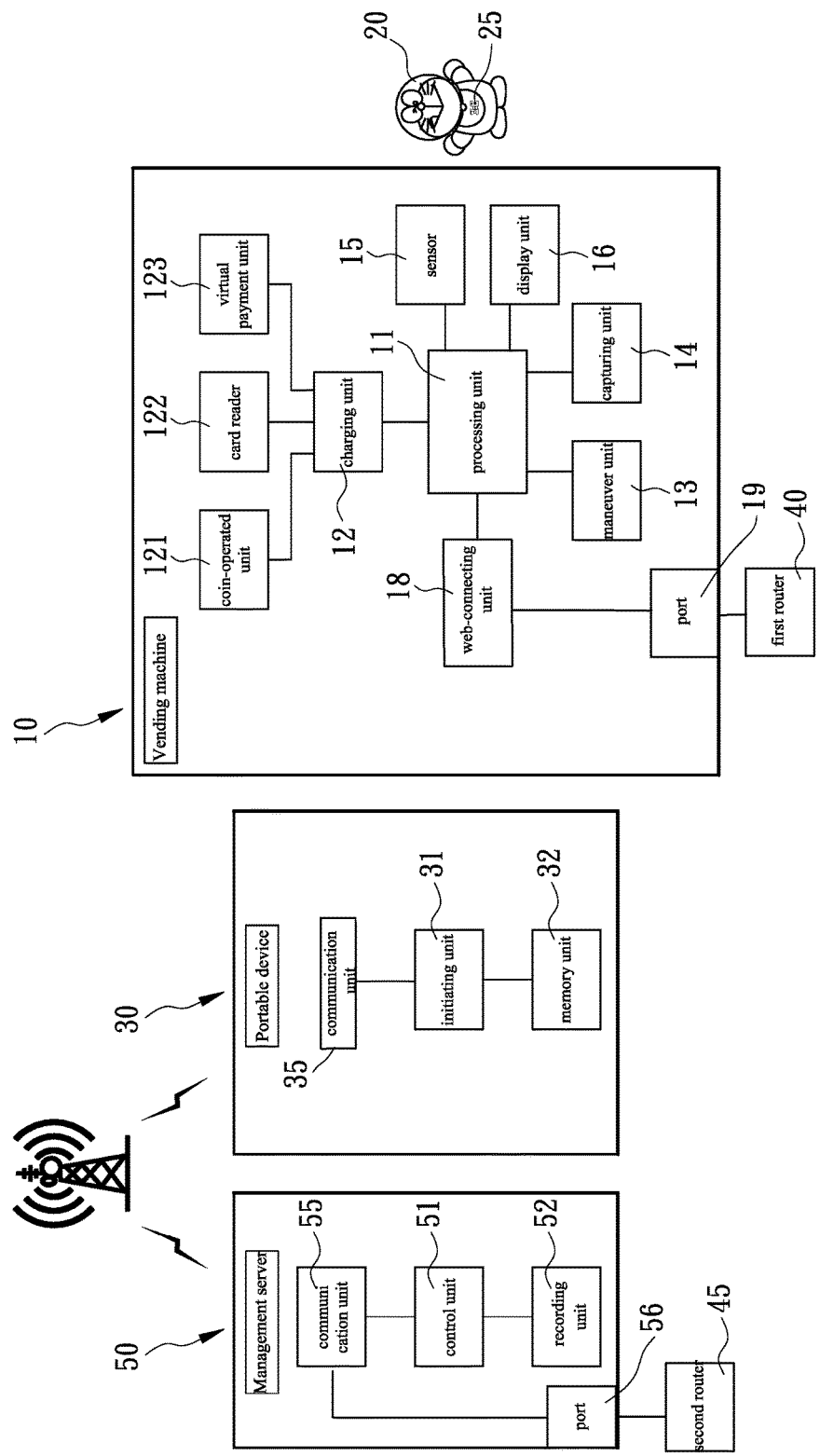
FIG. 1 is a block diagram of an interactive vending system according to the preferred embodiment of the present invention.

Referring to FIG. 1, an interactive vending system includes at least one vending machine 10, at least one portable device 30 and a management server 50 according to the preferred embodiment of the present invention. The vending machine 10, the portable device 30 and the management server 50 is in communication of data with one another via a network such as the internet. The management server 50 is used for back-stage management of transactions that a player does with the vending machine 10 for promotion.

The vending machine 10 is a doll-clipping machine, a drink-vending machine, washing machine, a dryer or a camera for example. The flowing description will be given to a doll-clipping machine for example. The vending machine 10 includes a space 100 for receiving products 20 such as dolls. The vending machine 10 further includes a chute (not numbered) via which each of the products 20 can be moved out of the space 100.

Figure 2:
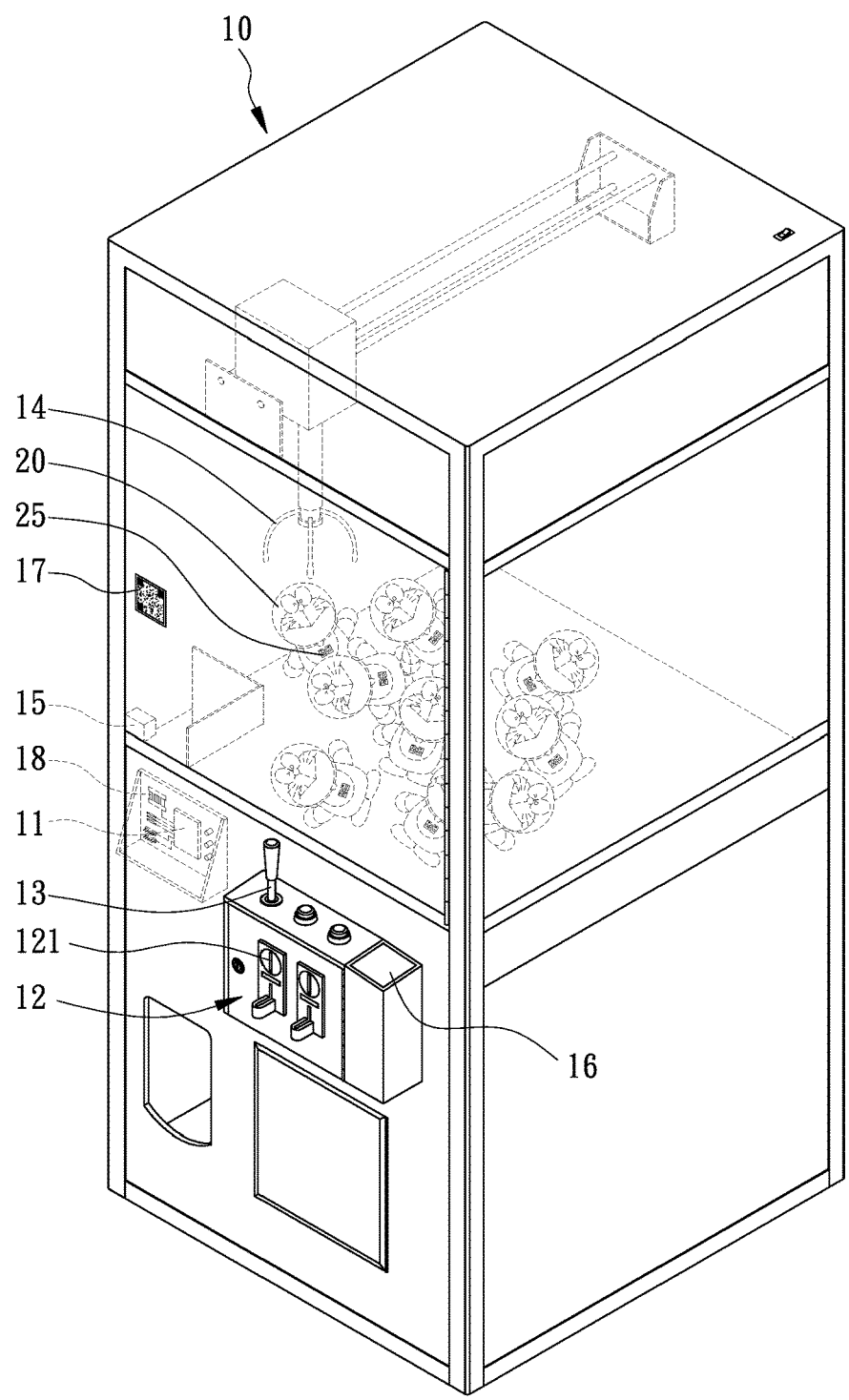
FIG. 2 is a perspective view of a vending machine incorporating the interactive vending system shown in FIG. 1.

Referring to FIGS. 1 and 2, the vending machine 10 includes a processing unit 11, a charging unit 12, a maneuver unit 13, a product-capturing unit 14, a sensor 15, a display unit 16 and a web-connecting unit 18. The processing unit 11 is electrically connected to the charging unit 12, the product-capturing unit 14, the maneuver unit 13, the sensor 15, the display unit 16 and the web-connecting unit 18.

The charging unit 12 includes at least one coin-operated unit 121, a card reader 122 and a virtual payment unit 123. The coin-operated unit 121 allows a player to insert at least one coin therein to initiate the vending machine 10. The card reader 122 allows a player to use a deposit card or a concession card to use the vending machine 10. The virtual payment unit 123 allows a player to pay virtual currency for using the vending machine 10 via a wireless network without having to carry any real currency. Moreover, the virtual payment unit 123 allows a player to pay nothing for using the vending machine 10 if so agreed by a store in charge of the vending machine 10.

The maneuver unit 13 is electrically connected to the product-capturing unit 14. Thus, the maneuver unit 13 is operable to move the product-capturing unit 14 in the space 100 in a three-dimensional manner. Moreover, the maneuver unit 13 is operable to cause the product-capturing unit 14 to capture a selected one of the products 20 stored in the vending machine 10.

The sensor 15 is operable to detect that the product-capturing unit 14 captures one of the products 20 and drops it onto the chute. The sensor 15 is a feeler lever or an RFID reader for example. Preferably, the sensor 15 is an RFID reader. Accordingly, each of the products 20 is provided with an RFID tag 25 that can be detected by the sensor 15.

The display unit 16 is operable to show data of transactions conducted in the vending machine 10. The display unit 16 is preferably a touch panel operable to enter data.

The label unit 17 carries identity data of the vending machine 10. The label unit 17 is a sticker printed with a QR Code and attached to a proper portion of the vending machine 10 or a QR Code shown on the display unit 16. The label unit 17 can be read by the portable device 30.

The web-connecting unit 18 is provided with a port 19. A router 40 can be electrically connected to the port 19 to connect the vending machine 10 to the internet via the router 40. Thus, the transaction data can be sent to the management server 50 from the vending machine 10 and data can be sent to the vending machine 10 from the management server 50. The router 40 is operated based on cables (Ethernet) or in a wireless manner (Wi-Fi) for example.

The portable device 30 is a smart phone tablet computer with application programs built therein. The portable device 30 includes an initiating unit 31, a memory unit 32 and a web communication unit 35.

The initiating unit 31 is preferably an application program built in the portable device 30. The initiating unit 31 is used to obtain identity data of a player and identity data of the vending machine 10. The identity data of the vending machine 10 are provided in several manners. Firstly, the identity data of the vending machine 10 are entered to the vending machine 10 and shown on the display unit 16. Secondly, the identity data of the vending machine 10 are carried by a QR code read shown the display unit 16. Thirdly, the identity data of the vending machine 10 are carried on a QR code printed on a sticker attached to the vending machine 10. In the last two cases, the QR code is readable by a camera of the portable device 30. The initiating unit 31 identifies the player and the portable device 30 to obtain rights vested on the player. Furthermore, the initiating unit 31 facilitates determination of whether if the vending machine 10 is a qualified machine. Then, the initiating unit 31 communicates data with the vending machine 10 to initiate a round of game.

The memory unit 32 is used to record the identity data of the player or the transaction data from the management server 50.

The communication unit 35 is used to receive transaction data of the player from the management server 50. The communication unit 35 is operable to send transaction data of the player to the management server 50. The communication unit 35 can be operated in a wireless manner. In such a case, the communication unit 35 is operated according to a communication protocol at least as high as 2G for cell phone communication and connected to the internet via a cell site or a Wi-Fi access point.

The management server 50 includes a control unit 51, a recording unit 52 and a communication unit 55. The recording unit 52 is used to store the identity data of the player, the identity data of the vending machine 10 and various types of data related to management. The control unit 51 preferably includes a back-stage management program and an interface. The control unit 51 and the recording unit 52 are used together to collect data of the player for statistics and management by a manager of the vending system.

The communication unit 55 is electrically connected to the control unit 51 at an end. The communication 55 is electrically connected to a port 56 at another end.

A router 45 is electrically connected to the port 56. The router 45 is operated by cables (Ethernet) or in a wireless manner (Wi-Fi). The management server 50 is connected to the internet via the router 45. Thus, the management server 50, the portable device 30 and the vending machine 10 are in communication of data via the internet.

Figure 3:
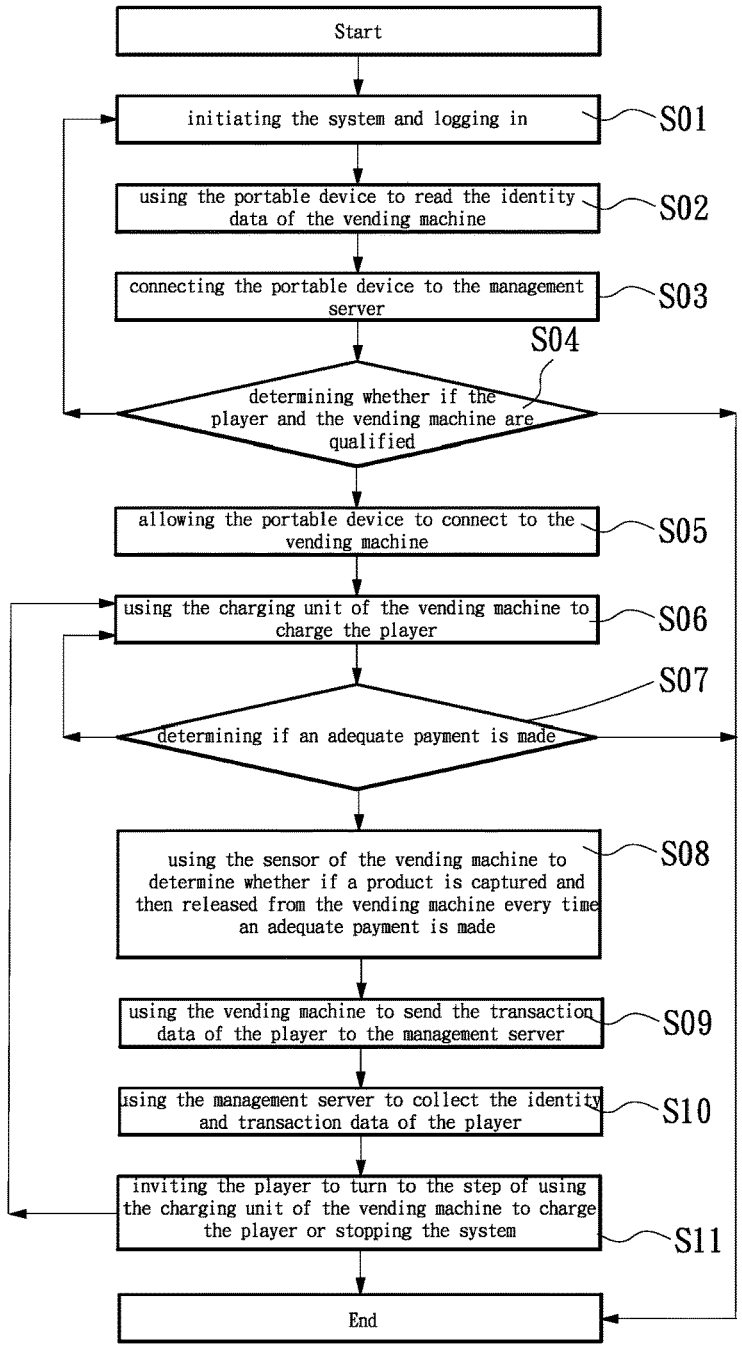
FIG. 3 is a flow chart of a method for operating the interactive vending system shown in FIG. 1.

Referring to FIGS. 1 through 3, in operation, the player uses the initiating unit 31 of the portable device 30 to identify him- or herself and identify the vending machine 10. By the connection to the cell phone communication system (2G or higher) or the Wi-Fi, the management server 50 is allowed to access to the transaction data of the player. Thus, the player is allowed to use the portable device 30 to enter his or her identity data and the identity data of the vending machine 10 to the management server 50 for management. Alternatively, the player uses the virtual currency deposited in the management server 50 to log in the vending machine 10, and the web-connecting unit 18 connects the vending machine 10 to the management server 50 to verify the qualification of the vending machine 10, thereby obtaining allowance for the player to use the vending machine 10, without having to use any coin to start a round of game with the vending machine 10. The transaction data of the player can be collected for statistics and management such as rewarding as means for promotion.

Referring to FIG. 3, the operation of the vending system will be described. To take part in the vending system, the player has to install the related application programs in the portable device 30 so that they player can communicate data with the management server 50 and react with the vending machine 10. Accordingly, corresponding application programs have to be installed in the management server 50.

At S01, the player initiates a round of game. The player turns on the initiating unit 31 of the portable device 30 thereof, i.e., the application program for the vending system. Then, the player uses existing membership to log in if the player has registered for membership. Otherwise, the player registers for new membership.

At S02, the portable device 30 reads the identity data of the vending machine 10. After logging in, the player uses the interface of the portable device 30 enter the identity data such as an identity number of the vending machine 10. The identity data is preferably an identity number. Alternatively, the player uses the portable device 30 to read the label unit 17 of the vending machine 10. As mentioned above, the label unit 17 is a sticker that carries a QR Code or an image of a QR Code shown on the display unit 16 for example. Thus, the portable device 30 obtains the identity data of the vending machine 10.

At S03, the portable device 30 is connected to the management server 50. After obtaining the identity data of the player and that of the vending machine 10, the initiating unit 31 of the portable device 30 instructs the communication unit 35 to communicate data with the communication unit 55 of the management server 50 in a wireless manner. The data are sent to the recording unit 52 of the management server 50.

At S04, the management server 50 determines whether if the vending machine 10 is qualified and whether if the player is qualified. The management server 50 uses the management program of the control unit 51 to compare the identity data from the portable device 30 with the identity data stored therein to determine whether each of them is qualified. The process returns to S01 if the player is not qualified. The process ends and the portable device 30 shows a nearest vending machine 10 based on a built-in map if the vending machine 10 is not qualified. The process goes to S05 if both of the player and the vending machine 10 are qualified.

At S05, a signal of successful connection is sent. After both of the player and the vending machine 10 are determined to be qualified, the management server 50 sends a confirming signal to the portable device 30 and the vending machine 10. The confirming signal is a serial number of a round of game free of charge. The portable device 30 receives the serial number, and the vending machine 10 receives a verifying code.

At S06, the charging unit 12 of the vending machine 10 charges. After the portable device 30 of the player is connected to the vending machine 10, the vending machine 10 uses the charging unit 12 to charge. Payments can be made by inserting at least one coin in the coin-operated unit 121 or by having a deposit card read by the card reader 122. Alternatively, payments can be made by previous deposit in the management server 50 or through a third party. After obtaining a proof of a payment, the portable device 30 enter the proof of payment to the vending machine 10 in which the proof of payment and the verifying code are used for authentication. Alternatively, the management server 50 gives a free-of-charge serial number to the vending machine 10 and the portable device 30, and the player enters the free-of-charge serial number to the vending machine 10 for authentication before the player is allowed to play a round of game free of charge.

At S07, the charging unit 12 of the vending machine 10 determines whether if the payment is adequate. After receiving the payment, the charging unit 12 of the vending machine 10 determines whether the payment is adequate or the round of game is free of charge. The system allows the player to decide to return to S06 for another payment or end the process if the payment is inadequate. The process turns to S08 if the payment is adequate.

At S08, the player uses the maneuver unit 13 of the vending machine 10 start a round of game. The player uses the maneuver unit 13 of the vending machine 10 to control the product-capturing unit 14 to capture or clip one of the products 20.

At S09, the sensor 15 of the vending machine 10 determines whether if a product 20 is captured and dropped onto the chute. After each payment, the sensor 15 of the vending machine 10 detects whether if a product 20 is captured and dropped onto the chute. As mentioned above, the sensor 15 could be a feeler lever actuated by a product 20 that is captured and dropped onto the chute. Preferably, the sensor 15 is an RFID reader for reading the RFID tag 25 of the sensor 15 to determine which of the products 20 is captured and dropped onto the chute.

At S10, the vending machine 10 sends data of the transaction to the management server 50. The sensor 15 of the vending machine 10 determines whether if the product 20 has been taken away. The processing unit 11 sends the result of the determination to the management server 50 through the web-connecting unit 18.

At S11, the management server 50 collects membership data of the player for management. After the communication unit 55 of the management server 50 receives the game data and the transaction data from the portable device 30 of the player or the vending machine 10, the control unit 51 collects the data for statistics, analysis, comparison and management, and results are recorded in the recording unit 52 for promotion or rewarding in the future. The system allows the player to turn S06 for another payment or ending the process.

The vending machine 10, the portable device 30 and the management server 50 can be connected to one another via the internet. Thus, the game data of the portable device 30 can be sent to the management server 50 in a wireless manner. Via the web-connecting unit 18, the game data of the vending machine 10 can be sent to the management server 50 for remote management. Advantageously, the vending system of the present invention allows a player to accumulate and send his or her game data to the management server 50, and allows a store to collect the data in a remote manner for statistics for promotion or rewarding in the future. Hence, the vending system of the present invention is more appealing than the prior art.

The present invention has been described via illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:
1. An interactive vending system comprising:
at least one vending machine comprising a processing unit, a charging unit electrically connected to the processing unit, a product-capturing unit electrically connected to the processing unit, a maneuver unit electrically connected to the processing unit and operable for controlling the product-capturing unit, a sensor electrically connected to the processing unit and adapted for detecting a product captured and dropped onto a chute of the vending machine, and a web-connecting unit electrically connected to the processing unit and made with a port;
a first router connected to the port, thereby connecting the vending machine to the internet;
at least one portable device comprising an initiating unit and a wireless communication unit electrically connected to the initiating unit and adapted for communicating data with the web-connecting unit via the internet;
a management server comprising a control unit, a recording unit adapted for cooperating with the control unit to manage data of transactions, and a communication unit electrically connected to the control unit and made with a port; and
a second router connected to the port of the management server, thereby connecting the management server to the internet;
wherein the interactive vending system is operated based on a method comprising the following steps:
inviting a player to use the portable device to initiate a corresponding application program and using previously registered membership to log in or registering for membership;
inviting the player to use the portable device to enter the identity data of the vending machine after logging in;
sending the identity data of the portable device and the identity data of the vending machine to the management server from the portable device;
using the management server to check the identity data of the player and the identity data of the vending machine to determine whether if the player and the vending machine are qualified;
turning to the step of inviting a player to use the portable device to initiate a corresponding application program if the player is not qualified;

terminating the process if the vending machine is not qualified;

using the management server to send a verifying signal to the portable device to allow the wireless communication unit of the portable device to connect to the web-connecting unit of the vending machine if the player and the vending machine are qualified;

using the charging unit to charge the player;

using the charging unit to determine whether if an adequate payment is made;

returning to the step of using the charging unit to charge the player or terminating the process if an adequate payment is not made;

using the maneuver unit of the vending machine to control the product-capturing unit to capture a selected one of the products;

using the sensor of the vending machine to determine whether if a product is captured and then released from the vending machine every time an adequate payment is made;

using the vending machine to send the transaction data of the player to the management server by using the web-connecting unit of the vending machine or the wireless communication unit of the portable device to send the transaction data of the player to the management server;

using the management server to collect the identity and transaction data of the player for management comprising statistic, analysis, checking, promotion and rewards; and inviting the player to turn to the step of using the charging unit of the vending machine to charge the player or terminating the process.

2. The interactive vending system according to claim 1, wherein the charging unit comprises at least one unit selected from the group consisting of a coin-operated unit, a card reader and a virtual payment unit.

3. The interactive vending system according to claim 1, wherein the sensor comprises an RFID reader for reading an RFID tag attached to a product.

4. The interactive vending system according to claim 1, wherein the vending machine further comprises a display unit electrically connected to the processing unit and adapted for showing the transaction data and game data.

5. The interactive vending system according to claim 1, wherein the portable device is a programmable device selected from the group consisting of a smart phone and tablet computer.

6. The interactive vending system according to claim 1, wherein one of the first and second routers is based on cables.

7. The interactive vending system according to claim 1, wherein one of the first and second routers is operated in a wireless manner.

8. The interactive vending system according to claim 1, wherein the initiating unit comprises at least one application program.

9. The interactive vending system according to claim 1, wherein the control unit comprises at least one back-stage management program.

10. The interactive vending system according to claim 1, wherein the vending machine further comprises a label unit provided thereon and adapted for identification thereof.

* * * * *